US012116806B2

(12) United States Patent
Chen

(10) Patent No.: US 12,116,806 B2
(45) Date of Patent: Oct. 15, 2024

(54) ELECTRONIC CYLINDRICAL LOCK

(71) Applicant: POWERTEK HARDWARE CO., LTD., Taichung (TW)

(72) Inventor: Chung-Yu Chen, Taichung (TW)

(73) Assignee: POWERTEK HARDWARE CO., LTD., Taichung (TW)

( * ) Notice: Subject to any disclaimer, the term of this patent is extended or adjusted under 35 U.S.C. 154(b) by 193 days.

(21) Appl. No.: 18/051,768

(22) Filed: Nov. 1, 2022

(65) Prior Publication Data

US 2023/0151641 A1 May 18, 2023

(30) Foreign Application Priority Data

Nov. 16, 2021 (TW) ................................ 110142634

(51) Int. Cl.
*E05B 47/06* (2006.01)

(52) U.S. Cl.
CPC ........ *E05B 47/0615* (2013.01); *E05B 47/063* (2013.01); *E05B 47/0642* (2013.01)

(58) Field of Classification Search
CPC ...... E05B 47/00; E05B 47/06; E05B 47/0611; E05B 47/0615; E05B 47/0619; E05B 47/0623; E05B 47/0626; E05B 47/063; E05B 47/0634; E05B 47/0638; E05B 47/0642; E05B 47/0646; E05B 47/0649; E05B 47/0653
USPC ........................................................... 70/277
See application file for complete search history.

(56) References Cited

U.S. PATENT DOCUMENTS

| | | | | | |
|---|---|---|---|---|---|
| 4,956,984 | A * | 9/1990 | Chi-Cheng | E05B 47/068 | 70/277 |
| 5,953,942 | A * | 9/1999 | Doucet | E05B 47/0688 | 70/277 |
| 6,640,594 | B1 * | 11/2003 | Yao | E05B 47/0692 | 70/279.1 |
| 7,845,201 | B2 * | 12/2010 | Meyerle | G07C 9/00563 | 70/279.1 |
| 8,051,689 | B1 * | 11/2011 | Shen | E05B 47/068 | 70/279.1 |
| 8,141,400 | B2 * | 3/2012 | Sorensen | E05B 47/068 | 70/277 |
| 10,643,412 | B1 * | 5/2020 | Yang | H04N 7/183 | |
| 2009/0049878 | A1 * | 2/2009 | Amir | E05B 47/0611 | 70/279.1 |
| 2015/0315818 | A1 * | 11/2015 | Shen | E05B 47/0012 | 292/144 |
| 2021/0277686 | A1 * | 9/2021 | Chen | E05B 47/0046 | |

* cited by examiner

*Primary Examiner* — Nathan Cumar
(74) *Attorney, Agent, or Firm* — Sinorica International Patent & Trademark

(57) ABSTRACT

An electronic cylindrical lock has a main body. The main body includes a slide member. The main body further includes a first clutch unit and a second clutch unit to drive the slide member. The first clutch unit and the second clutch unit are connected with a first handle and a second handle, respectively. The main body further includes a control unit for controlling the first clutch unit and the second clutch unit to be engaged or disengaged, so as to selectively allow the first handle and the second handle to drive the lock tongue, or selectively allow the first handle and the second handle not to drive the lock tongue.

10 Claims, 12 Drawing Sheets

ELECTRONIC CYLINDRICAL LOCK

FIELD OF THE INVENTION

The present invention relates to a cylindrical lock, and more particularly to an electronic cylindrical lock.

BACKGROUND OF THE INVENTION

A cylindrical lock is often installed on a door body to control the opening and closing of the door. The cylindrical lock generally has a main body. The main body is provided with a slide member. The slide member is connected to a lock tongue. Either side of the main body is provided with a handle for driving the slide member to move, so as to move the lock tongue to open the door.

With the advent of the electronic generation, it is necessary to improve the conventional cylindrical lock to be an electronic cylindrical lock. Because the internal space of the main body is used as the slide space of the slide member, there is no extra space in the main body for accommodating the control elements required for the electronic cylindrical lock, such as a motor or solenoid valve. Besides, most of the conventional cylindrical locks can only lock the handle outside the door, and cannot lock the handle inside the door.

SUMMARY OF THE INVENTION

The primary object of the present invention is to provide an electronic cylindrical lock, which can be electronically controlled to lock and unlock a door. When in a locked state, it can prevent the handle inside and the handle outside the door from driving the lock tongue at the same time; when in an unlocked state, the handle inside and the handle outside the door can drive the lock tongue at the same time, so as to achieve the effect of two-way control.

In order to achieve the above-mentioned object, the electronic cylindrical lock provided by the present invention comprises a main body. The main body has a slide space therein for accommodating a slide member. The slide member is connected with a lock tongue. One side of the main body has a first through hole communicating with the slide space for installing a first clutch unit. The first clutch unit is connected with a first handle. The other side of the main body has a second through hole communicating with the slide space for installing a second clutch unit. The second clutch unit is connected with a second handle. The main body is provided with a control unit in the slide space. The control unit is configured to control the first clutch unit and the second clutch unit.

In the electronic cylindrical lock provided by the present invention, when the electronic cylindrical lock is in the unlocked state, the control unit is engaged with the first clutch unit and the second clutch unit. At this time, the user can turn the first handle, so that the first handle drives the slide member to slide through the first clutch unit and the slide member drives the lock tongue to move; and the user can turn the second handle, so that the second handle drives the slide member to slide through the second clutch unit and the slide member drives the lock tongue to move. When the electronic cylindrical lock is in the locked state, the control unit is disengaged from the first clutch unit and the second clutch unit. At this time, the first handle and the second handle are unable to drive the slide member to move the lock tongue. In this way, the purpose of electronic control and two-way access control can be achieved.

DETAILED DESCRIPTION OF THE PREFERRED EMBODIMENTS

Embodiments of the present invention will now be described, by way of example only, with reference to the accompanying drawings.

Figure 1:
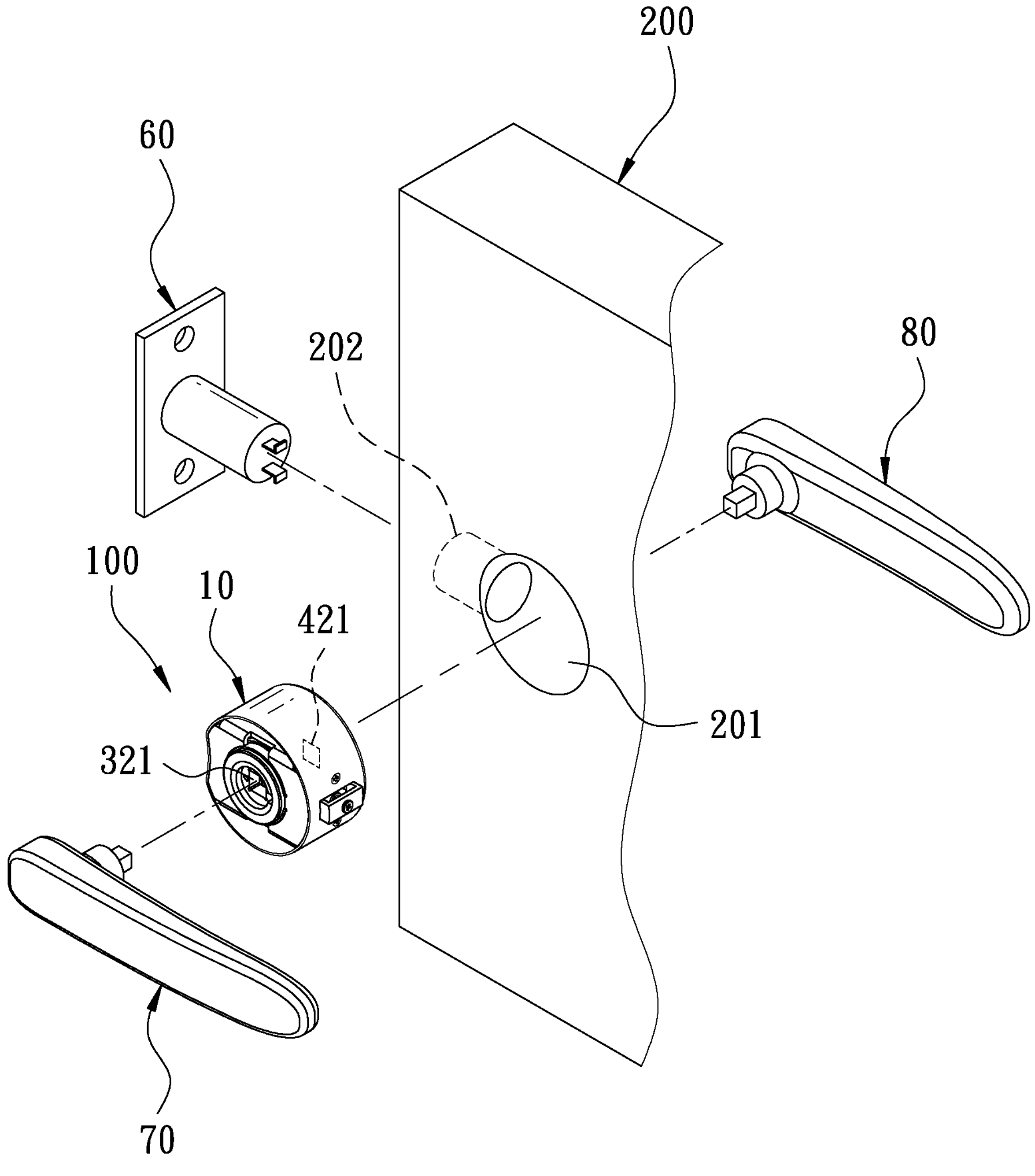
FIG. 1 is an exploded view according to a preferred embodiment of the present invention.
Figure 2:
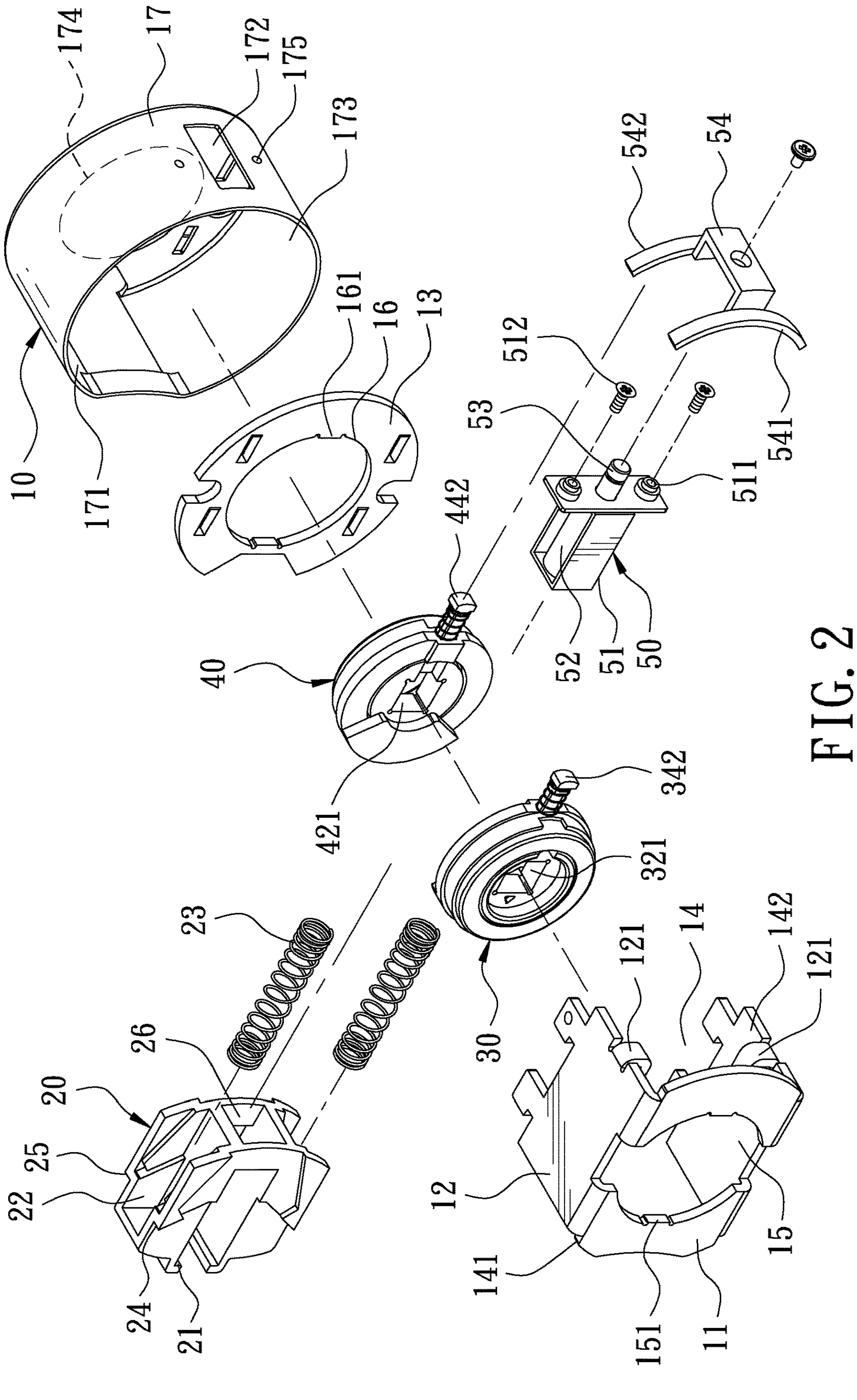
FIG. 2 is an exploded view of the main body according to the preferred embodiment of the present invention.

As shown in FIG. 1 and FIG. 2, the present invention discloses an electronic cylindrical lock 100. The electronic cylindrical lock 100 is installed to a door body 200. The door body 200 has a mounting hole 201. The mounting hole 201 is connected with a lateral lock tongue hole 202. The electronic cylindrical lock 100 includes a main body 10. The main body 10 is disposed in the mounting hole 201. The main body 10 has a first side wall 11. One side of the first side wall 11 is connected with two connecting walls 12 extending laterally. A second side wall 13 is connected between the connecting walls 12. A slide space 14 is enclosed by the first side wall 11, the connecting walls 12 and the second side wall 13. The peripheral side of the main body 10 is formed with a first end opening 141 and a second end opening 142 that communicate with the slide space 14 for accommodating a slide member 20. The first side wall 11 has a first through hole 15 communicating with the slide space 14. The inner edge of the first through hole 15 is provided with at least one first positioning block 151 for positioning a first clutch unit 30. The second side wall 13 has a second through hole 16 communicating with the slide space 14. The inner edge of the second through hole 16 is provided with at least one second positioning block 161 for positioning a second clutch unit 40. The electronic cylindrical lock 100 further comprises a control unit 50. The control unit 50 is disposed in the slide space 14 and is located close to the second end opening 142 for controlling the first clutch unit 30 and the second clutch unit 40. The main body 10 further has a housing 17. The housing 17 covers the first side wall 11, the connecting walls 12 and the second side wall 13. The housing 17 has a first opening 171 corresponding to the slide member 20, a second opening 172 corresponding to the control unit 50, a third opening 173 corresponding to the first clutch unit 30, and a fourth opening 174 corresponding to the second clutch unit 40. The electronic cylindrical lock 100 further comprises a lock tongue 60. The lock tongue 60 is installed in the lock tongue hole 202 and located outside the first end opening 141 of the main body 10 for connecting the slide member 20. The electronic cylindrical lock 100 further comprises a first handle 70. The first handle 70 is disposed outside the first through hole 15 of the main body 10 and connected to the first clutch unit 30. The electronic cylindrical lock 100 further comprises a second handle 80. The second handle 80 is disposed outside the second through hole 16 of the main body 10 and connected to the second clutch unit 40.

Figure 3:
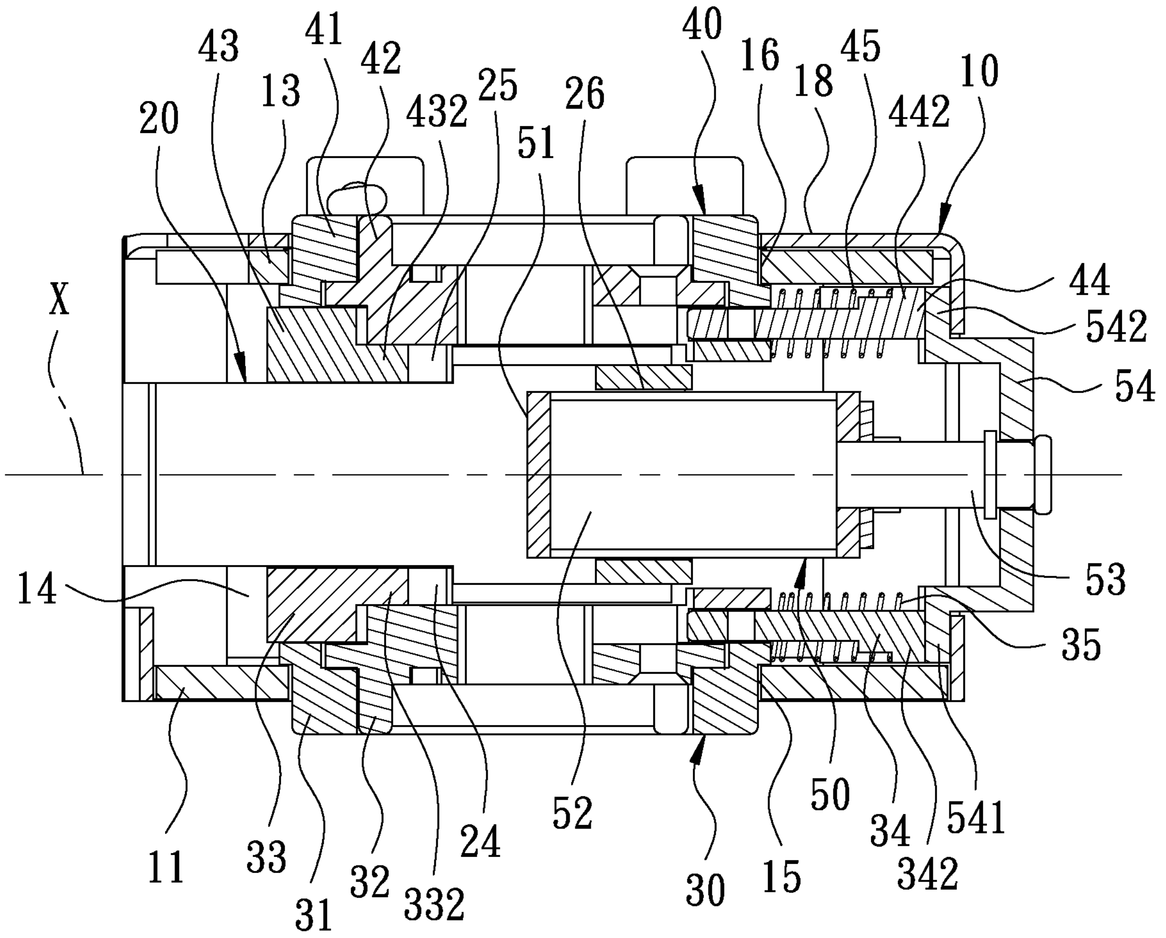
FIG. 3 is a cross-sectional view of the main body according to the preferred embodiment of the present invention.

Please refer to FIG. 2 and FIG. 3. Each of the connecting walls 12 of the main body 10 has a blocking portion 121 close to the second end opening 142. The slide member 20 is slidable relative to the main body 10 along a slide axis X. One side of the slide member 20, facing the first end opening 141, has a connecting portion 21 for connecting the lock tongue 60 shown in FIG. 1. One side of the slide member 20, facing the second end opening 142, has a holding groove 22 corresponding to the blocking portion 121. An elastic member 23 is provided in the holding groove 22. The other end of the elastic member 23 is against the blocking portion 121, so that the slide member 20 has a tendency to slide toward the first end opening 141. One side of the slide member 20, facing the first through hole 15, has a first actuated portion 24. One side of the slide member 20, facing the second through hole 16, has a second actuated portion 25. In this embodiment, the first actuated portion 24 and the second actuated portion 25 are guide slopes.

Figure 4:
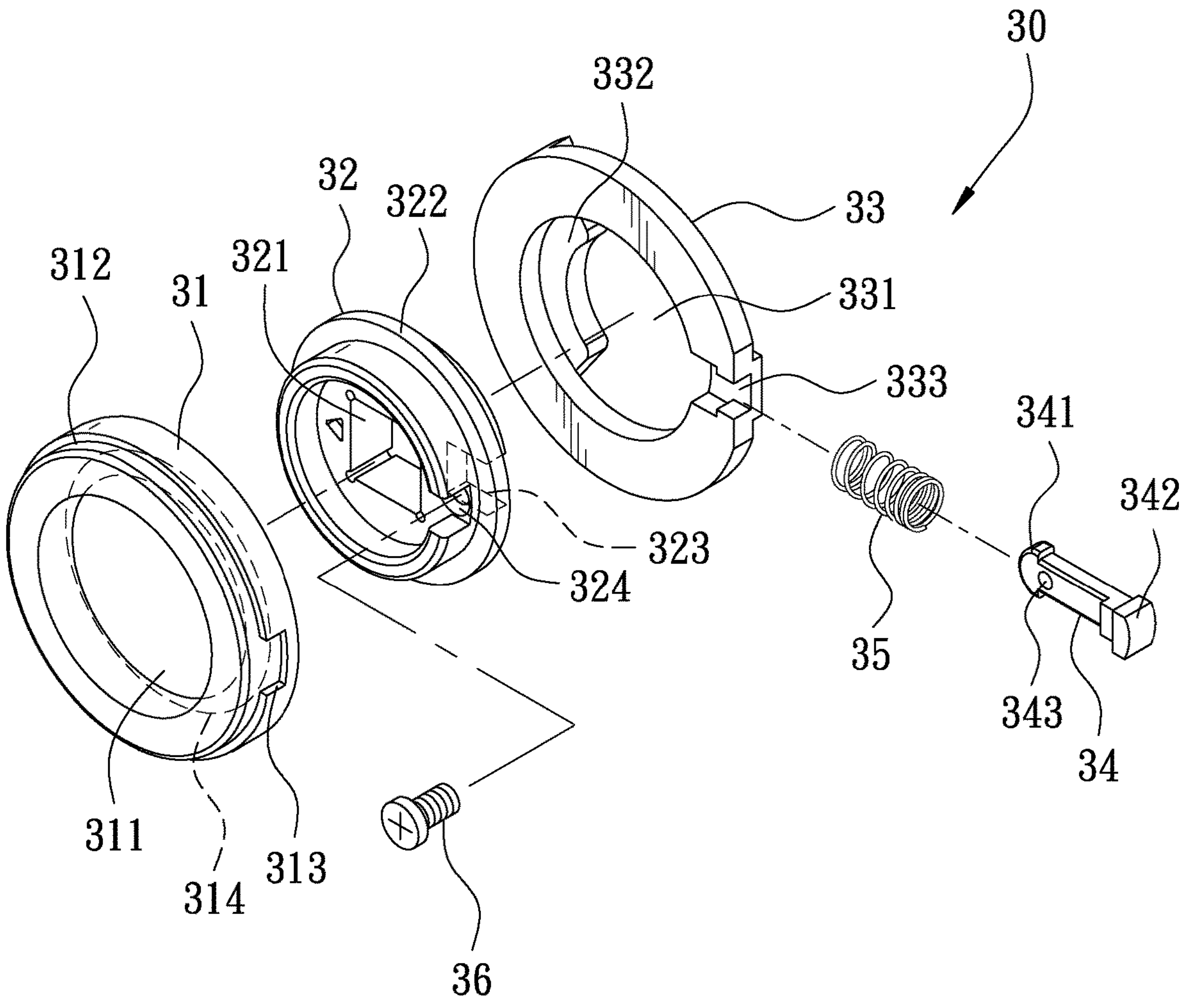
FIG. 4 is an exploded view of the first clutch unit according to the preferred embodiment of the present invention.

Please refer to FIG. 4, in cooperation with FIG. 2. The first clutch unit 30 has a first fixing ring 31 fixed in the first through hole 15. The first fixing ring 31 defines a first perforation 311 along the axial direction of the first through hole 15. In this embodiment, the peripheral side of the first fixing ring 31 has a first annular groove 312 corresponding to the first through hole 15 and a first positioning groove 313 corresponding to the first positioning block 151. The first positioning block 151 is positioned in the first positioning groove 313 so that the first fixing ring 31 is fixed in the first through hole 15. A first accommodating groove 314 is formed on the inner side of the first fixing ring 31 corresponding to the first perforation 311. The first clutch unit 30 further has a first rotating ring 32 that is rotatable relative to the main body 10. The center of the first rotating ring 32 has a first coupling portion 321, such as a polygonal hole shown in FIG. 1, for connecting the first handle 70 shown in FIG. 1. In this embodiment, the first rotating ring 32 is rotatably disposed in the first perforation 311. The peripheral side of the first rotating ring 32 has a first annular flange 322 corresponding to the first accommodating groove 314. The first annular flange 322 is accommodated in the first accommodating groove 314. The peripheral side of the first rotating ring 32 has a first clutch groove 323. The first clutch unit 30 further has a first actuating ring 33. The center of the first actuating ring 33 has a first center hole 331, so that the first actuating ring 33 is rotatably sleeved on the peripheral side of the first rotating ring 32. The peripheral side of the first actuating ring 33 has a first actuating portion 332 corresponding to the first actuated portion 24 of the slide member 20 and a first slide groove 333 corresponding to the first clutch groove 323. In this embodiment, the first actuating portion 332 is an arc-shaped protrusion to be pressed against the first actuated portion 24. The first clutch unit 30 further has a first engaging pin 34. The first engaging pin 34 is slidably disposed in the first slide groove 332. One end of the first engaging pin 34 has a first engaging portion 341 corresponding to the first clutch groove 323. The other end of the first engaging pin 34 extends out of the first slide groove 332 and has a first head portion 342. A first spring 35 is provided between the first head portion 342 and the first actuating ring 33.

Figure 5:
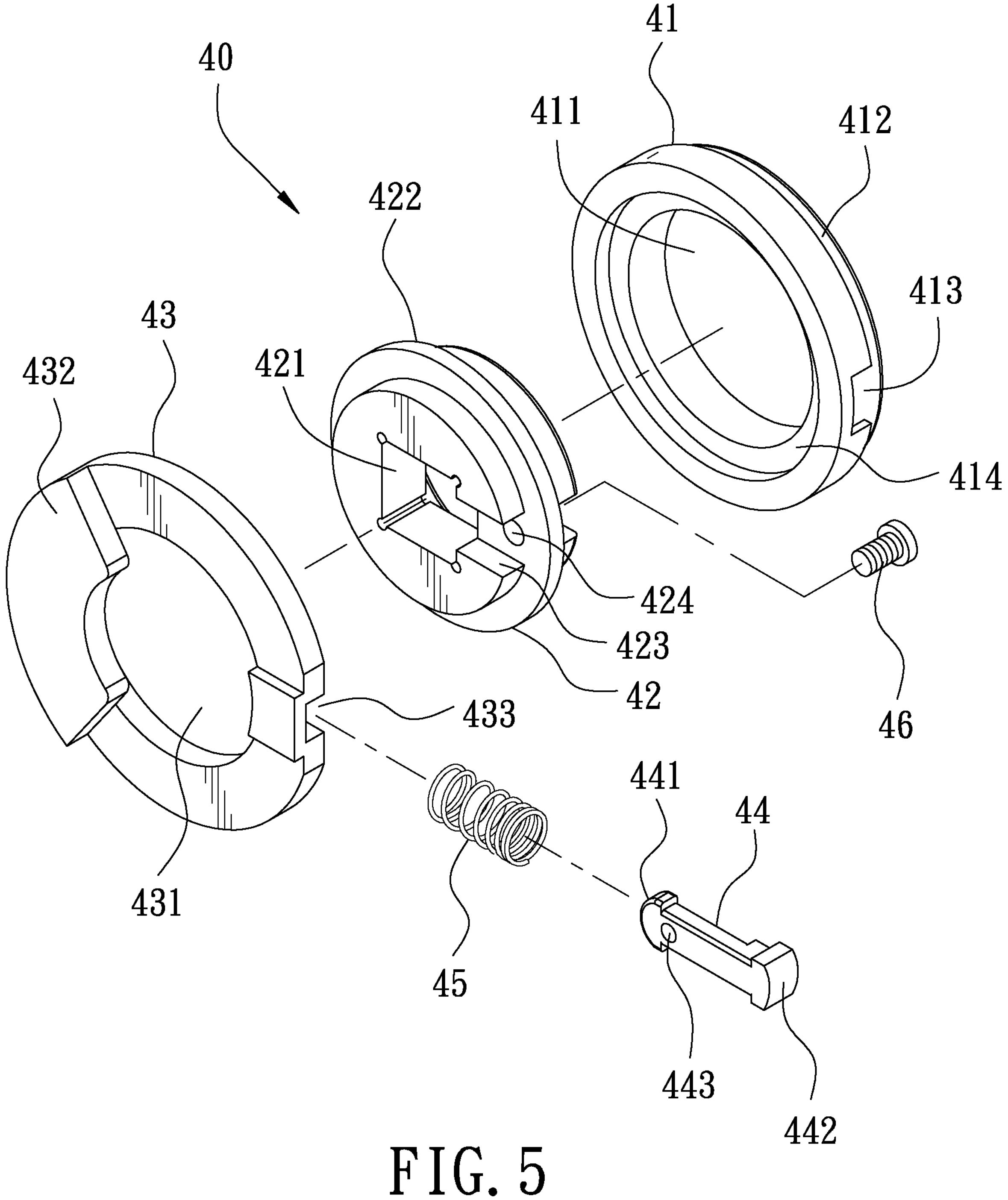
FIG. 5 is an exploded view of the second clutch unit according to the preferred embodiment of the present invention.

Please refer to FIG. 5, in cooperation with FIG. 2. The second clutch unit 40 has a second fixing ring 41 fixed in the second through hole 16. The second fixing ring 41 defines a second perforation 411 along the axial direction of the second through hole 16. In this embodiment, the peripheral side of the second fixing ring 41 has a second annular groove 412 corresponding to the second through hole 16 and a second positioning groove 413 corresponding to the second positioning block 161. The second positioning block 161 is positioned in the second positioning groove 413 so that the second fixing ring 41 is fixed in the second through hole 16. A second accommodating groove 414 is formed on the inner side of the second fixing ring 41 corresponding to the second perforation 411. The second clutch unit 40 further has a second rotating ring 42 that is rotatable relative to the main body 10. The center of the second rotating ring 42 has a second coupling portion 421, such as a polygonal hole shown in FIG. 1, for connecting the second handle 80 shown in FIG. 1. In this embodiment, the second rotating ring 42 is rotatably disposed in the second perforation 411. The peripheral side of the second rotating ring 42 has a second annular flange 422 corresponding to the second accommodating groove 414. The second annular flange 422 is accommodated in the second accommodating groove 414. The peripheral side of the second rotating ring 42 has a second clutch groove 423. The second clutch unit 40 further has a second actuating ring 43. The center of the second actuating ring 43 has a second center hole 431, so that the second actuating ring 43 is rotatably sleeved on the peripheral side of the second rotating ring 42. The peripheral side of the second actuating ring 43 has a second actuating portion 432 corresponding to the second actuated portion 25 of the slide member 20 and a second slide groove 433 corresponding to the second clutch groove 423. In this embodiment, the second actuating portion 432 is an arc-shaped protrusion to be pressed against the second actuated portion 25. The second clutch unit 40 further has a second engaging pin 44. The second engaging pin 44 is slidably disposed in the second slide groove 432. One end of the second engaging pin 44 has a second engaging portion 441 corresponding to the second clutch groove 423. The other end of the second engaging pin 44 extends out of the second slide groove 433 and has a second head portion 442. A second spring 45 is provided between the second head portion 442 and the second actuating ring 43.

Referring to FIG. 2 and FIG. 3, the slide member 20 has a receiving space 26 extending along the slide axis X. The control unit 50 is disposed in the slide space 14 of the main body 10 and is located corresponding in position to the receiving space 26 of the slide member 20. Thus, when the slide member 20 slides along the slide axis X, the control unit 50 will not interfere with the slide of the slide member 20. The control unit 50 includes a fixing seat 51 connected to the main body 10. In this embodiment, the housing 17 has two first fixing holes 175. The fixing seat 51 has two second fixing holes 511 corresponding to the first fixing holes 175, and includes two fixing members 512. The fixing members 512 are respectively inserted through and fixed to the first fixing holes 175 and the second fixing holes 511, thereby fixing the fixing seat 51 to the inner wall of the housing 17 adjacent to the second opening 172. The fixing seat 51 is provided with a electric driving member 52. The electric driving member 52 has a driving shaft 53. The driving shaft 53 is connected to a pressing member 54. The pressing member 54 has a first pressing portion 541 corresponding to the first head portion 342 and a second pressing portion 542 corresponding to the second head portion 442. In this embodiment, the electric driving member 52 is a solenoid valve. The driving shaft 53 is connected to the pressing member 54 in a locking manner, so that the electric driving member 52 can drive the pressing member 54 to move, but not limited thereto. Those skilled in the art should understand that there are other implementations that can achieve the same effect. For example, the electric driving member 52 may be a motor, and the driving shaft 53 may be a screw rod. The pressing member 54 has a corresponding screw hole, so that the motor can screw the pressing member 54 to move.

Figure 6:
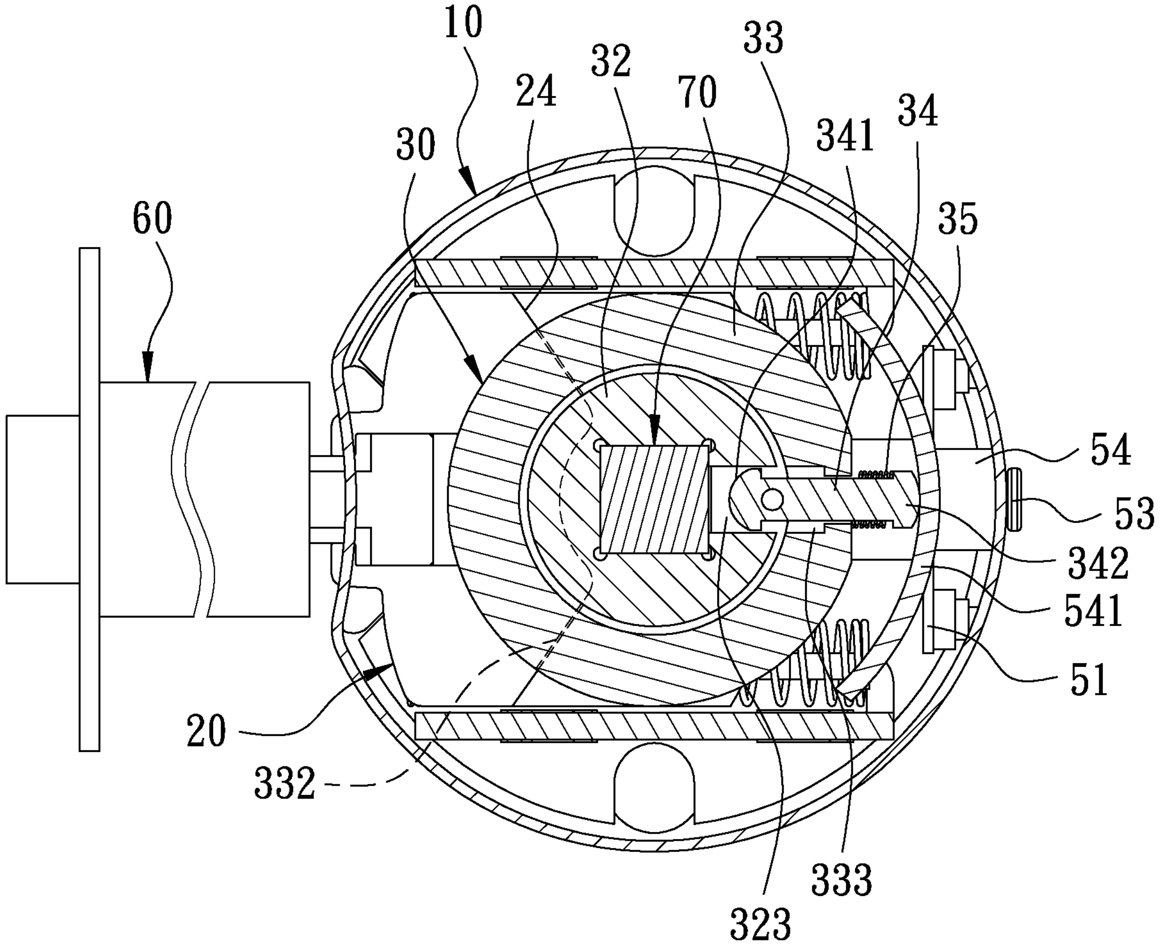
FIG. 6 is a schematic view of the preferred embodiment of the present invention in the locked state.
Figure 7:
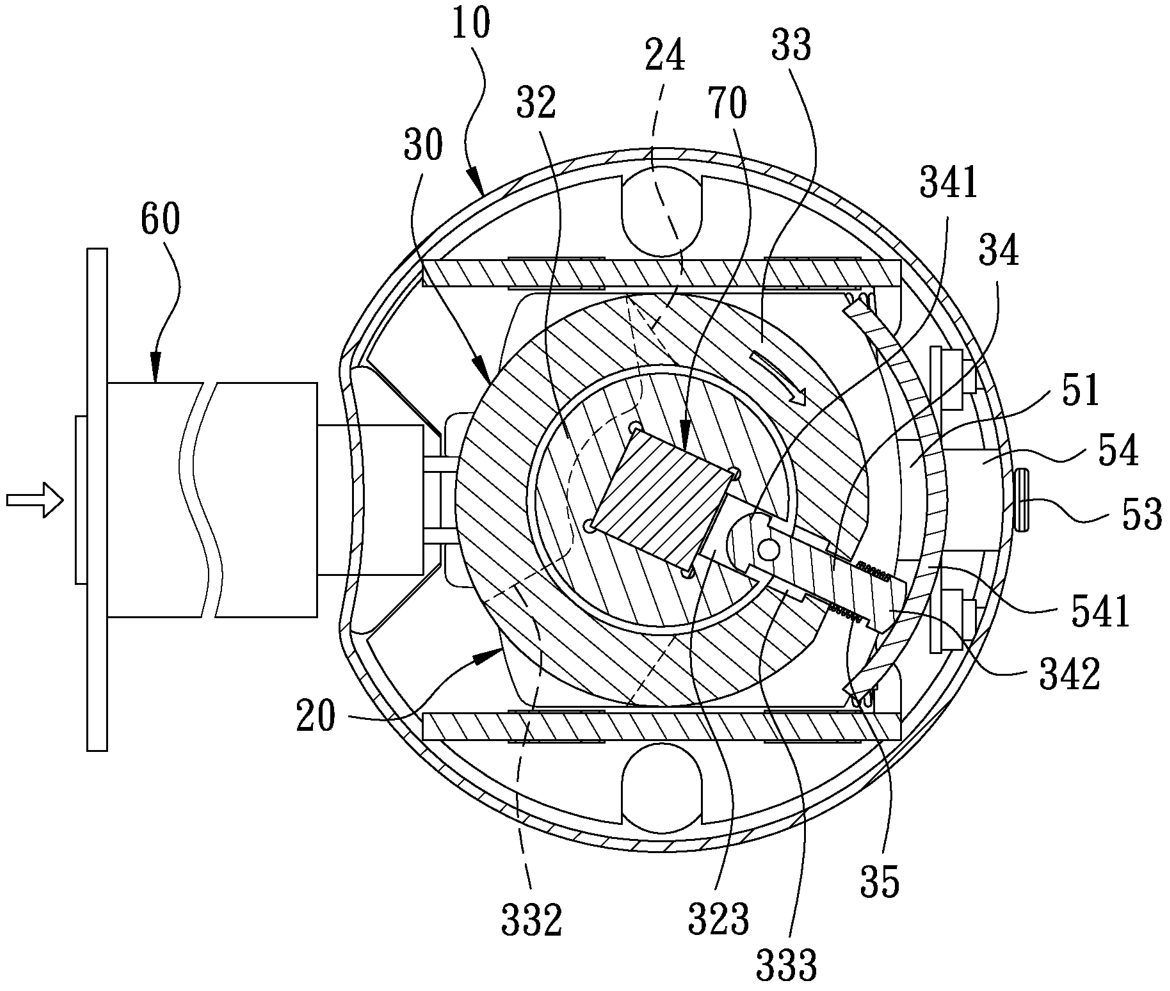
FIG. 7 is a schematic view of the preferred embodiment of the present invention in the locked state, illustrating the operation of the first clutch unit.

Please refer to FIG. 6 and FIG. 7. When the electronic cylindrical lock 100 is in an unlocked state, the electric driving member 52 drives the pressing member 54 to move towards the first clutch unit 30, and the first pressing portion 541 presses against the first engaging pin 34 so that the first engaging portion 341 of the first engaging pin 34 is engaged in the first clutch groove 323. Thus, when the user rotates the first handle 70, the first handle 70 drives the first rotating ring 32 to rotate, so that the first rotating ring 32 drives the first actuating ring 33 to rotate through the first engaging pin 34, and the first actuating portion 332 of the first actuating ring 33 pushes the first actuated portion 24 to pull the slide member 20 to move towards the control unit 50, thereby driving the lock tongue 60 to move, so as to open the door body 200.

Figure 8:
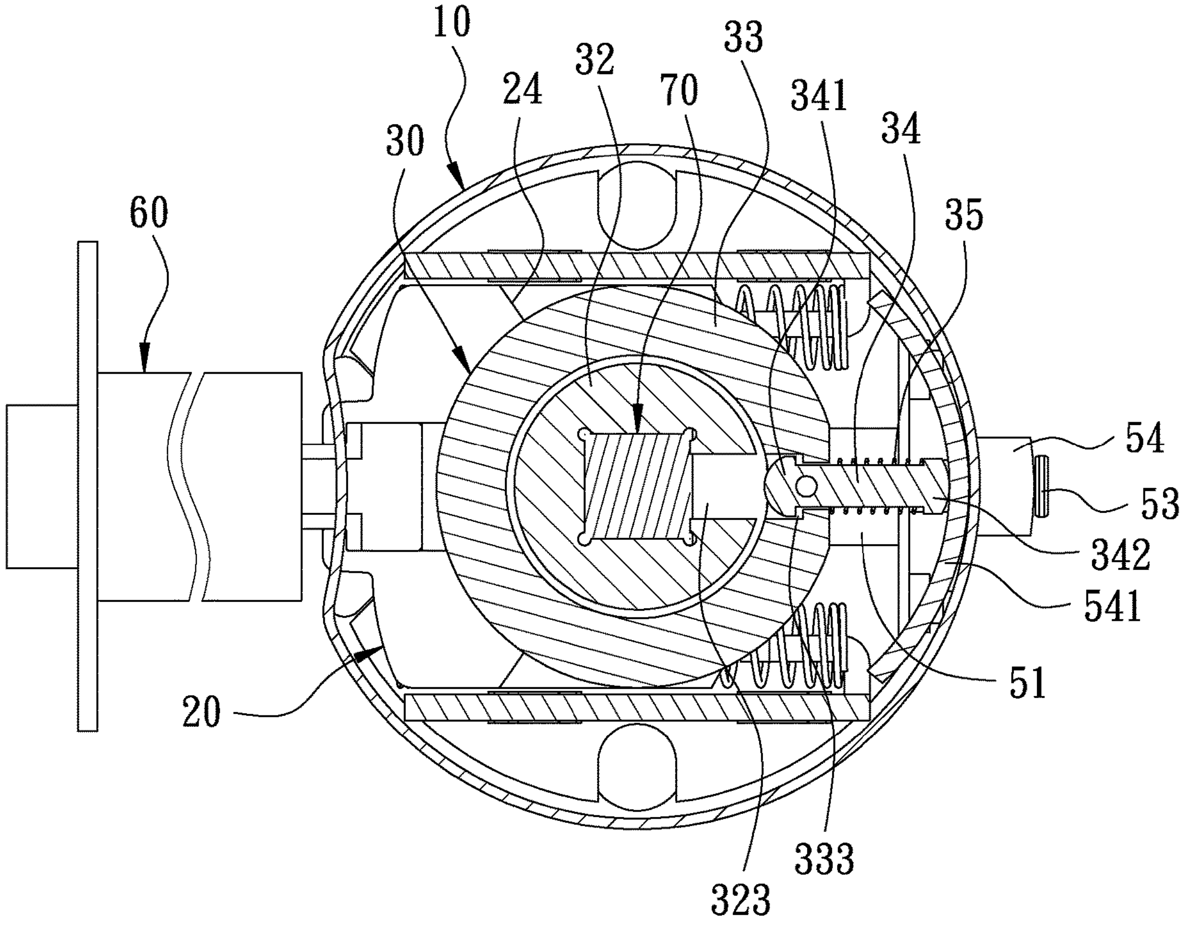
FIG. 8 is a schematic view of the preferred embodiment of the present invention in the unlocked state.
Figure 9:
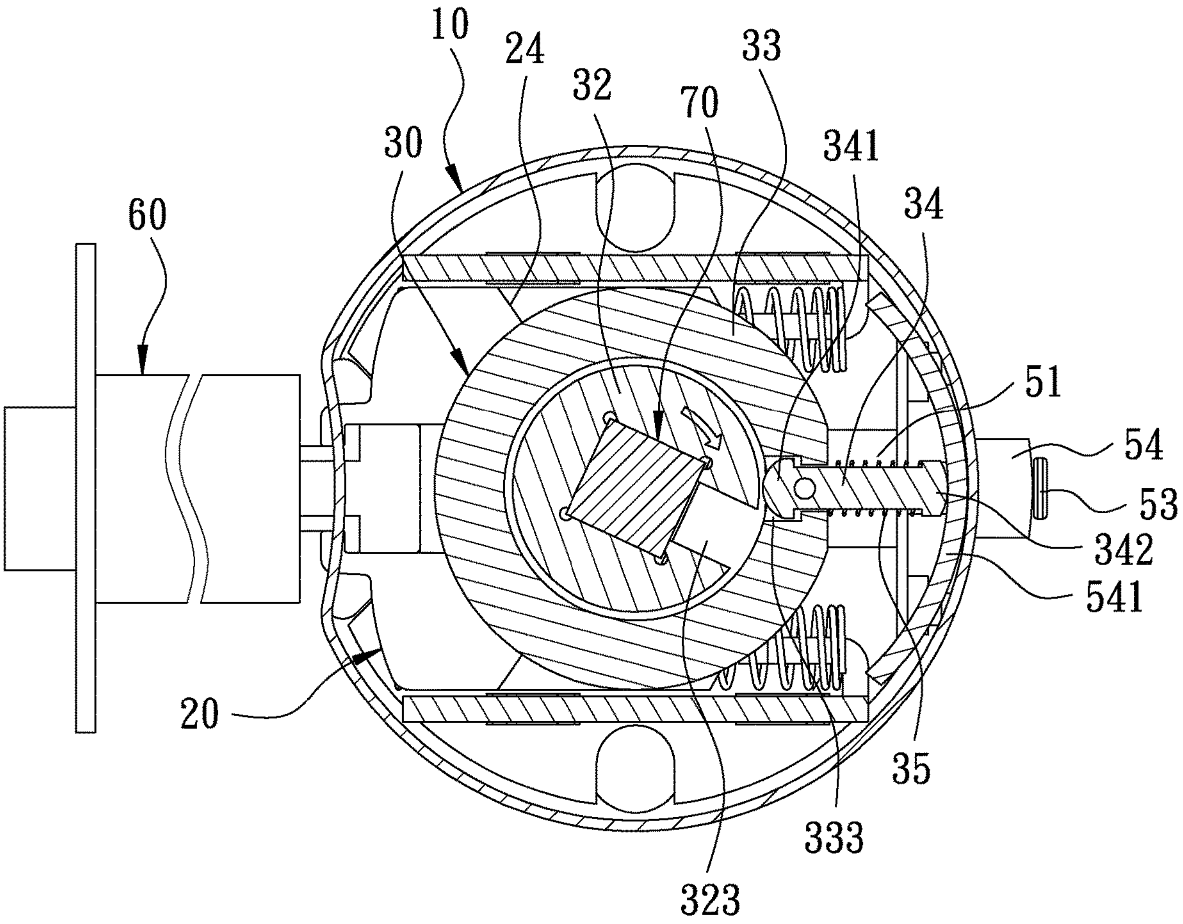
FIG. 9 is a schematic view of the preferred embodiment of the present invention in the unlocked state, illustrating the operation of the first clutch unit.

Please refer to FIG. 8 and FIG. 9. When the electronic cylindrical lock 100 is in a locked state, the electric driving member 52 drives the pressing member 54 to move away from the first clutch unit 30, and the first pressing portion 541 is away from the first engaging pin 34 so that the first engaging portion 341 of the first engaging pin 34 is pushed by the first spring 35 to disengage from the first clutch groove 323. Thus, when the user rotates the first handle 70, only the first rotating ring 32 is driven to rotate relative to the main body 10. The first actuating ring 33 cannot be driven to move the lock tongue 60.

Figure 10:
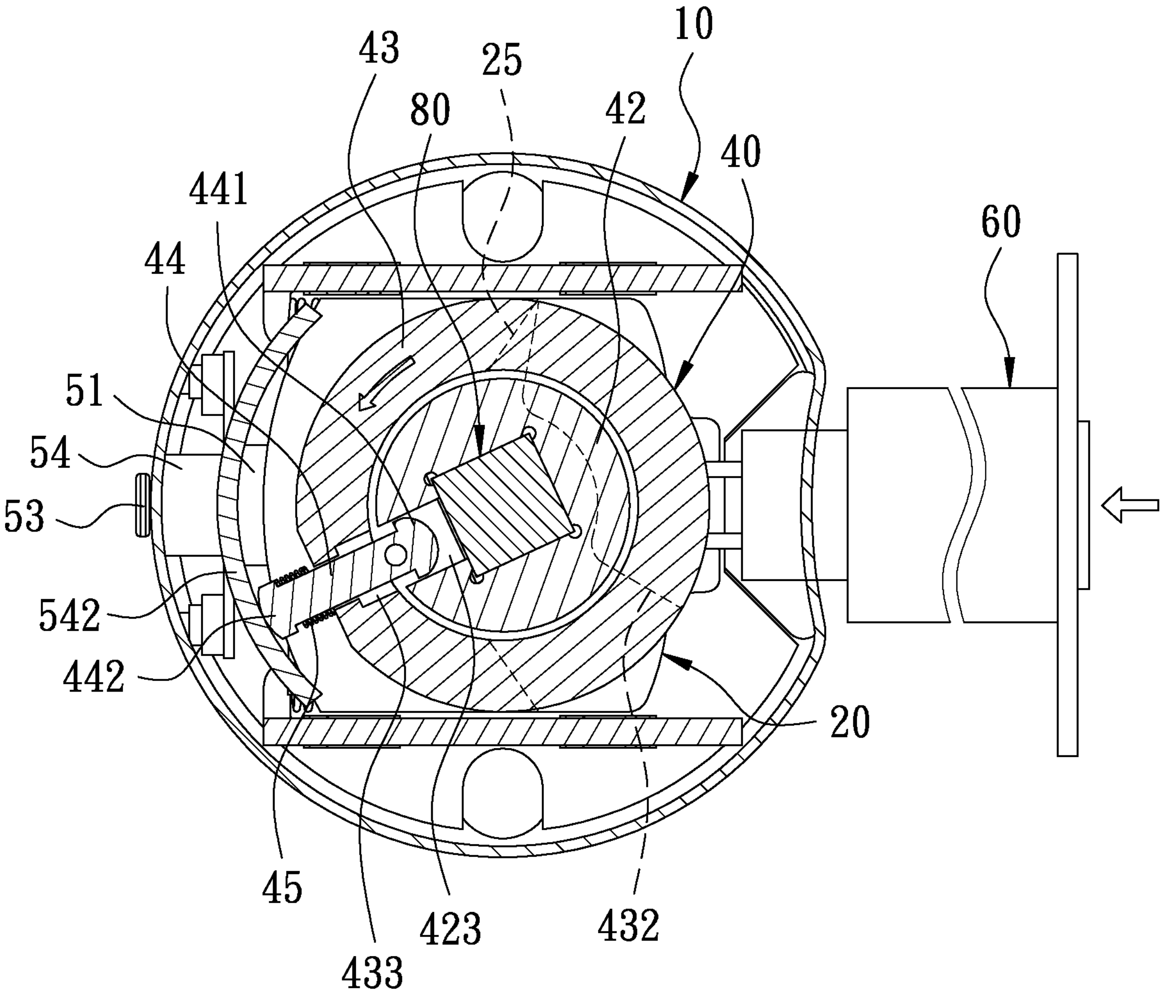
FIG. 10 is a schematic view of the preferred embodiment of the present invention in the locked state, illustrating the operation of the second clutch unit.
Figure 11:
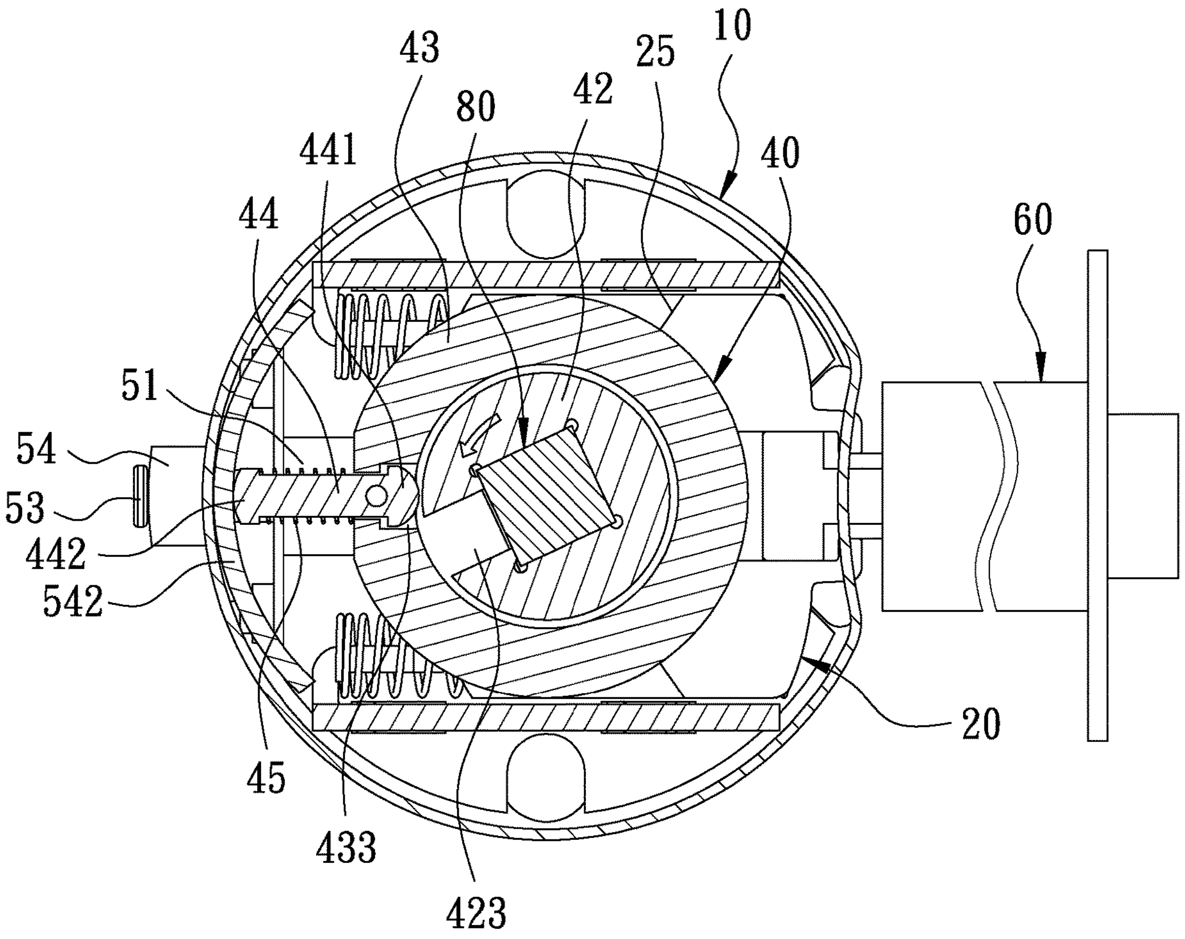
FIG. 11 is a schematic view of the preferred embodiment of the present invention in the unlocked state, illustrating the operation of the second clutch unit.

In the same principle, referring to FIG. 10 and FIG. 11, when the electronic cylindrical lock 100 is in the unlocked state, as shown in FIG. 10, the second engaging portion 441 of the second engaging pin 44 is engaged in the second clutch groove 323, so that the second handle 80 can pull the slide member 20 to drive the lock tongue 60 to move. When the electronic cylindrical lock 100 is in the locked state, as shown in FIG. 11, the second engaging portion 441 of the second engaging pin 44 is disengaged from the second clutch groove 323, so that the second handle 80 cannot pull the slide member 20 to drive the lock tongue 60 to move. Thereby, the user can control the door body 200 to be locked or unlocked in an electronic control manner. When in the locked state, the first handle 70 and the second handle 80 cannot drive the lock tongue 60 at the same time; when in the unlocked state, the first handle 70 and the second handle 80 can drive the lock tongue 60 at the same time, so as to achieve the purpose of two-way access control.

Figure 12:
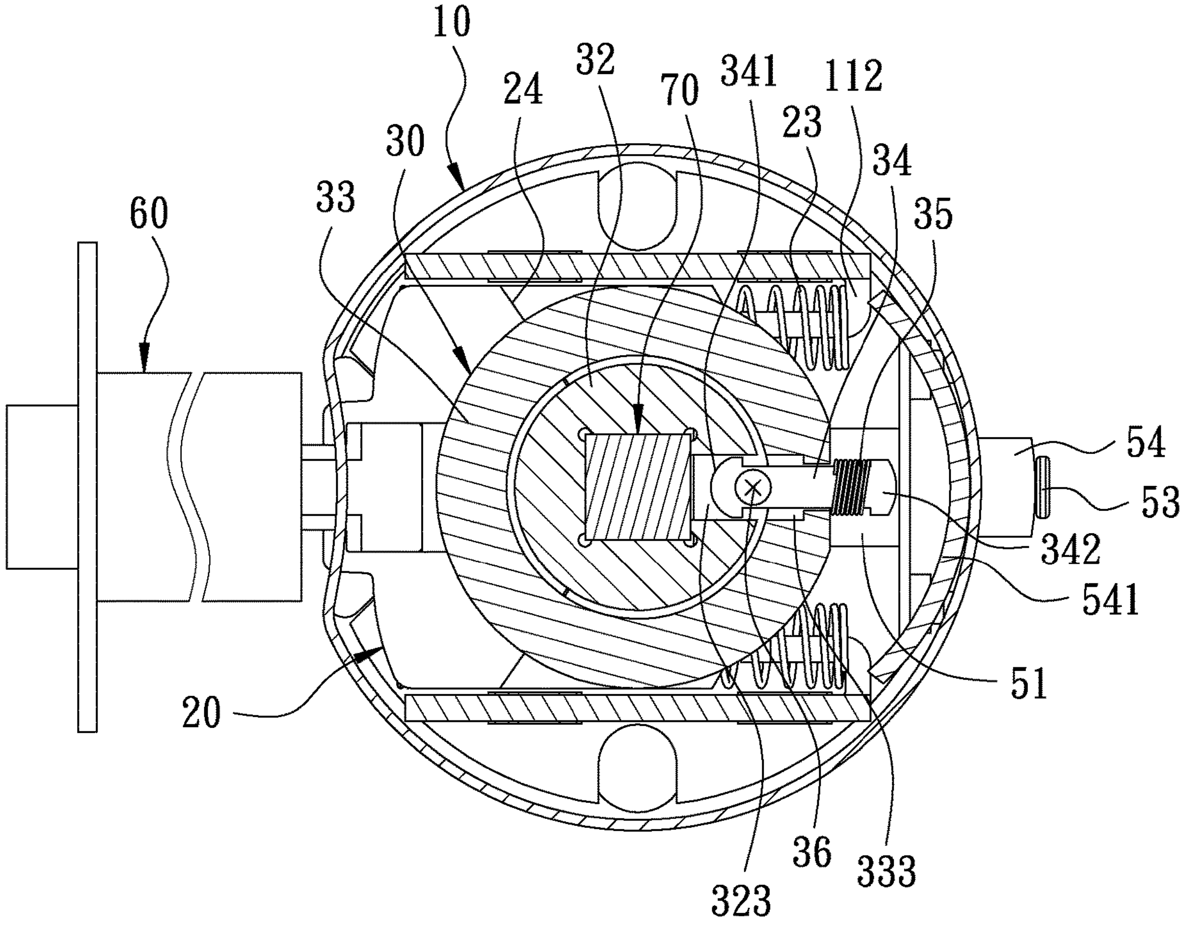
FIG. 12 is a schematic view of the preferred embodiment of the present invention when the first clutch unit is locked.

Please refer to FIG. 4 again. The first rotating ring 32 has a first locking hole 324 in the first clutch groove 323. The first engaging pin 34 has a first aperture 343 corresponding to the first locking hole 423, and is provided with a first locking member 36. The first locking member 36 passes through the first aperture 343 and is detachably locked to the first locking hole 324 for securing the first engaging pin 34 to the first rotating ring 32. Please refer to FIG. 5. The second rotating ring 42 has a second locking hole 424 in the second clutch groove 423. The second engaging pin 44 has a second aperture 443 corresponding to the second locking hole 424, and is provided with a second locking member 46. The second locking member 46 passes through the second aperture 443 and is detachably locked to the second locking hole 424 for securing the second engaging pin 44 to the second rotating ring 42. As shown in FIG. 12, when the user wants the first handle 70 to pull the lock tongue 60 regardless of whether the electronic cylindrical lock is in the locked state or the unlocked state, the first locking member 36 passes through the first aperture 343 and is locked to the first locking hole 324, so that the first engaging portion 341 of the first engaging pin 34 is engaged in the first clutch groove 323, and is not controlled by the control unit 50. In the same principle, the operation of the second clutch unit 40 is the same as that of the first clutch unit 30, so it is not repeated hereinafter. In this way, the user can further adjust the one-way control or two-way control according to the access control requirements.

What is claimed is:

1. An electronic cylindrical lock, comprising:

a main body, having a first side wall, one side of the first side wall being connected with two connecting walls extending laterally, a second side wall being connected between the connecting walls, a slide space being enclosed by the first side wall, the connecting walls and the second side wall, a peripheral side of the main body being formed with a first end opening and a second end opening that communicate with the slide space, the first side wall having a first through hole communicating with the slide space, the second side wall having a second through hole communicating with the slide space, the main body having at least one blocking portion close to the second end opening;

a slide member, disposed in the slide space, the slide member being slidable relative to the main body along a slide axis, one side of the slide member, facing the first end opening, having a connecting portion, one side of the slide member, facing the second end opening, being provided with at least one elastic member, another end of the elastic member being against the blocking portion, one side of the slide member, facing the first through hole, having a first actuated portion, one side of the slide member, facing the second through hole, having a second actuated portion, the slide member having a receiving space extending along the slide axis;

a first clutch unit, disposed in the first through hole of the main body, the first clutch unit having a first rotating ring that is rotatable relative to the main body, a center of the first rotating ring having a first coupling portion, a peripheral side of the first rotating ring having a first clutch groove, the first clutch unit further having a first actuating ring, the first actuating ring being rotatably sleeved on the peripheral side of the first rotating ring, a peripheral side of the first actuating ring having a first actuating portion corresponding to the first actuated portion and a first slide groove corresponding to the first clutch groove, the first clutch unit further having a first engaging pin, the first engaging pin being slidably disposed in the first slide groove, one end of the first engaging pin having a first engaging portion corresponding to the first clutch groove, another end of the first engaging pin extending out of the first slide groove and having a first head portion, a first spring being provided between the first head portion and the first actuating ring;

a second clutch unit, disposed in the second through hole of the main body, the second clutch unit having a second rotating ring that is rotatable relative to the main body, a center of the second rotating ring having a second coupling portion, a peripheral side of the second rotating ring having a second clutch groove, the second clutch unit further having a second actuating ring, the second actuating ring being rotatably sleeved on the peripheral side of the second rotating ring, a peripheral side of the second actuating ring having a second actuating portion corresponding to the second actuated portion and a second slide groove corresponding to the second clutch groove, the second clutch unit further having a second engaging pin, the second engaging pin being slidably disposed in the second slide groove, one end of the second engaging pin having a second engaging portion corresponding to the second clutch groove, another end of the second engaging pin extending out of the second slide groove and having a second head portion, a second spring being provided between the second head portion and the second actuating ring;

a control unit, disposed in the slide space of the main body and located corresponding in position to the receiving space, the control unit including a fixing seat connected to the main body, the fixing seat being provided with an electric driving member, the electric driving member having a driving shaft, the driving shaft being connected to a pressing member, the pressing member having a first pressing portion corresponding to the first head portion and a second pressing portion corresponding to the second head portion;

a lock tongue, disposed outside the first end opening of the main body and connected to the connecting portion of the slide member;

a first handle, disposed outside the first through hole of the main body and connected to the first coupling portion so that the first handle can drive the first rotating ring to rotate relative to the main body; and a second handle, disposed outside the second through hole of the main body and connected to the second coupling portion so that the second handle can drive the second rotating ring to rotate relative to the main body.

2. The electronic cylindrical lock as claimed in claim 1, wherein the main body further has a housing, the housing covers the first side wall, the connecting walls and the second side wall, and the housing has a first opening corresponding to the slide member, a second opening corresponding to the control unit, a third opening corresponding to the first clutch unit, and a fourth opening corresponding to the second clutch unit.

3. The electronic cylindrical lock as claimed in claim 2, wherein the fixing seat of the control unit is fixed to an inner wall of the housing adjacent to the second opening.

4. The electronic cylindrical lock as claimed in claim 1, wherein the first clutch unit further has a first fixing ring, the first fixing ring is fixed in the first through hole, the first fixing ring defines a first perforation along an axial direction of the first through hole, a first accommodating groove is formed on an inner side of the first fixing ring corresponding to the first perforation, the first rotating ring is rotatably disposed in the first perforation, a peripheral side of the first rotating ring has a first annular flange corresponding to the first accommodating groove, and the first annular flange is accommodated in the first accommodating groove.

5. The electronic cylindrical lock as claimed in claim 4, wherein an inner edge of the first through hole of the main body is provided with at least one first positioning block, the peripheral side of the first fixing ring has a first positioning groove corresponding to the first positioning block, and the first positioning block is positioned in the first positioning groove.

6. The electronic cylindrical lock as claimed in claim 1, wherein the first rotating ring has a first locking hole in the first clutch groove, the first engaging pin has a first aperture corresponding to the first locking hole and is provided with a first locking member, and the first locking member passes through the first aperture and is detachably locked to the first locking hole for securing the first engaging pin to the first rotating ring.

7. The electronic cylindrical lock as claimed in claim 1, wherein the second clutch unit further has a second fixing ring, the second fixing ring is fixed in the second through hole, the second fixing ring defines a second perforation along an axial direction of the second through hole, a second accommodating groove is formed on an inner side of the second fixing ring corresponding to the second perforation, the second rotating ring is rotatably disposed in the second perforation, a peripheral side of the second rotating ring has a second annular flange corresponding to the second accommodating groove, and the second annular flange is accommodated in the second accommodating groove.

8. The electronic cylindrical lock as claimed in claim 7, wherein an inner edge of the second through hole of the main body is provided with at least one second positioning block, the peripheral side of the second fixing ring has a second positioning groove corresponding to the second positioning block, and the second positioning block is positioned in the second positioning groove.

9. The electronic cylindrical lock as claimed in claim 1, wherein the second rotating ring has a second locking hole in the second clutch groove, the second engaging pin has a second aperture corresponding to the second locking hole and is provided with a second locking member, and the second locking member passes through the second aperture and is detachably locked to the second locking hole for securing the second engaging pin to the second rotating ring.

10. The electronic cylindrical lock as claimed in claim 1, wherein the electric driving member is a solenoid valve, and the driving shaft is connected to the pressing member in a locking manner so that the electric driving member can drive the pressing member to move.

* * * * *